(12) United States Patent  (10) Patent No.: US 8,928,847 B2
Hiratsuka et al.  (45) Date of Patent: Jan. 6, 2015

(54) LIQUID CRYSTAL DISPLAY DEVICE

(71) Applicant: Japan Display Inc., Tokyo (JP)

(72) Inventors: Takato Hiratsuka, Chiba (JP); Osamu Itou, Hitachi (JP); Masanao Yamamoto, Mobara (JP); Daisuke Sonoda, Chiba (JP)

(73) Assignee: Japan Display Inc., Tokyo (JP)

( * ) Notice: Subject to any disclaimer, the term of this patent is extended or adjusted under 35 U.S.C. 154(b) by 78 days.

(21) Appl. No.: 13/790,590

(22) Filed: Mar. 8, 2013

(65) Prior Publication Data

US 2013/0265534 A1    Oct. 10, 2013

(30) Foreign Application Priority Data

Apr. 10, 2012  (JP) ................... 2012-088872

(51) Int. Cl.
*G02F 1/1343* (2006.01)
*G02F 1/1339* (2006.01)
*G02F 1/1333* (2006.01)
*G02F 1/1337* (2006.01)

(52) U.S. Cl.
CPC .... *G02F 1/134363* (2013.01); *G02F 1/133377* (2013.01); *G02F 1/133707* (2013.01)
USPC ............................ 349/141; 349/143; 349/155

(58) Field of Classification Search
USPC .................................................. 349/143, 141
See application file for complete search history.

(56) References Cited

U.S. PATENT DOCUMENTS

| | | | |
|---|---|---|---|
| 2006/0279685 A1* | 12/2006 | Hirakata et al. | 349/141 |
| 2011/0128491 A1* | 6/2011 | Kubota et al. | 349/139 |
| 2011/0249229 A1* | 10/2011 | Kubota et al. | 349/141 |
| 2012/0257156 A1* | 10/2012 | Hiratsuka et al. | 349/143 |

FOREIGN PATENT DOCUMENTS

JP      6-214244      8/1994

* cited by examiner

*Primary Examiner* — Dennis Y Kim
(74) *Attorney, Agent, or Firm* — Ulmer & Berne LLP

(57) ABSTRACT

The liquid crystal display device includes a pixel structure provided with a large wall formed along a long side of a pixel with a rectangular plane, a small wall formed at a center of the pixel and extending in the same direction as the large wall, a wall electrode formed on a wall surface of the large wall, a plane electrode formed between the small and large walls, in which the wall electrode and the plane electrode form a pixel electrode, and a common electrode formed on a surface of the small wall. The large wall has a part with an increased thickness at an end part of the pixel. The wall electrode is bent toward the center of the pixel. This structure prevents decrease of reverse twist of liquid crystal at an end part of the pixel as well as generation of domain, thus improving transmittance of the screen.

9 Claims, 16 Drawing Sheets

LIQUID CRYSTAL DISPLAY DEVICE

CLAIM OF PRIORITY

The present application claims priority from Japanese Patent Application JP 2012-086872 filed on Apr. 10, 2012, the content of which is hereby incorporated by reference into this application.

BACKGROUND OF THE INVENTION

1. Technical Field

The present invention relates to a display device, and more particularly, the present invention relates to an IPS type liquid crystal display device with excellent viewing angle property, which is capable of realizing a high-definition screen.

2. Related Art

The liquid crystal display panel, used for the liquid crystal display device includes a TFT substrate having pixels with pixel electrodes and thin film transistors (TFT) arranged in a matrix, a counter substrate that faces the TFT substrate and has color filters at positions corresponding to the pixel electrodes of the TFT substrate, and a liquid crystal interposed between the TFT substrate and the counter substrate. The image is generated by controlling the light transmittance of the liquid crystal molecule for the respective pixels.

Since the liquid crystal display device has a light-weight and flat structure, it has been widely employed for the use in various fields. The compact liquid crystal display device has been extensively applied to the mobile phone, DSC (Digital Still Camera) and the like. The liquid crystal display device has a problem concerning the viewing angle property as the phenomenon that brightness, chromaticity and the like on the screen viewed from front are different from those on the screen obliquely viewed. The IPS (In Plane Switching) type that activates the liquid crystal molecules by the horizontal electric field exhibits excellent viewing angle property.

Japanese Unexamined Patent Application Publication No. Hei 6-214244 discloses the structure as one of IPS types having an electrode formed on a part of the wall of the columnar spacer that defines the space between the TFT substrate and the counter substrate, which applies the voltage between the electrode on the wall and the electrode formed on the TFT substrate so as to efficiently generate the transverse electric field as shown in FIG. 4.

SUMMARY OF THE INVENTION

The high definition display device with fine resolution equal to or higher than WVGA (800×480) has been employed for high-end products such as the medium/small liquid crystal display devices. For the high definition display, the transmittance of the panel is a key factor. The screen, with far higher definition, has been demanded to evoke importance of transmittance of the panel. As the definition becomes higher, the voltage applied to the pixel electrode becomes more influential on the neighboring pixel. This may cause contamination between those pixels, resulting in deteriorated image quality.

To cope with the demand for the higher definition screen, the wall is formed in the pixel, on which the pixel electrode or the common electrode is formed, that is, the wall electrode IPS has been under development. The wall, electrode IPS allows improvement in efficiency of the display mode. The improved display mode efficiency increases the rate of the line of electric force in the transverse direction, thus enabling improvement in efficiency of the IPS type. The wall-like electrode makes it possible to apply the electric field to the entire pixel. Therefore, the voltage applied to the pixel electrode may be reduced.

Compared to the generally employed IPS type, the wall electrode IPS is capable of reducing intensity of the voltage applied to the liquid crystal layer. On the contrary, as the field intensity applied to the liquid crystal layer is low, the electric field in the reversely twisted direction generated in the pixel will cause the forward twisted liquid crystal to compete against the reversely twisted liquid crystal. This may generate the region within the pixel where the liquid crystal is immobilized, that is, domain is generated. As a result, the transmittance distribution in the pixel becomes inhomogeneous, thus causing the problem of significantly deteriorating the transmittance.

The present invention provides the liquid crystal display device with wall electrode IPS, which is configured to prevent generation of the domain within the pixel, and further prevent deterioration in the transmittance of the pixel.

In order to attain the object, the present invention is configured as described below.

(1) A liquid crystal display device includes a pixel structure provided with a large wall formed along a long side of a pixel with a rectangular plane, a small wall, formed at a center of the pixel and extending in the same direction as the large wall, a wall electrode formed on a wall, surface of the large wall, a plane electrode formed between the small wall and the large wall, in which the wall electrode and the plane electrode form a pixel electrode, and a common electrode formed on a surface of the small wall. The large wall has a part with an increased thickness at an end part of the pixel. The wall electrode is bent in a direction toward the center of the pixel.

(2) A liquid crystal display device includes a pixel structure provided with a large wall formed along a long side of a pixel with a rectangular plane, a small wall formed at a center of the pixel and extending in the same direction as the large wall, a wall electrode formed on a wall surface of the large wall, a plane electrode formed between the small wall and the large wall, in which the wall electrode and the plane electrode form a pixel electrode, and a common electrode formed on a surface of the small wall. The large wall has a part with an increased thickness at an end part of the pixel. The wall electrode is bent in a direction toward the center of the pixel. The small wall is bent in a direction away from the bent wall electrode at the end part of the pixel.

(3) A liquid crystal display device includes a pixel structure provided with a large wall formed along a long side of a pixel with a rectangular plane, a small, wall formed at a center of the pixel and extending in the same direction as the large wall, a wall electrode formed on a wall surface of the large wall, a plane electrode formed between the small wall and the large wall, in which the wall electrode and the plane electrode form a pixel electrode, and a common electrode formed on a surface of the small wall. The large wall, has a part with an increased thickness at an end part of the pixel. The wall electrode is bent in a direction toward the center of the pixel. The small wall has a length longer than that of the large wall. A part of the small wall corresponding to the length longer than that of the large wall is bent in a direction away from the bent wall electrode.

According to the present invention, the IPS type liquid crystal display device with the wall electrode is capable of preventing generation, of the domain within the pixel. This makes it possible to provide the liquid crystal display device with high definition screen as well as the property of high transmittance, therefore, high brightness.

DESCRIPTION OF THE PREFERRED EMBODIMENTS

The present invention will be described referring to the following embodiments.

First Embodiment

Figure 1:
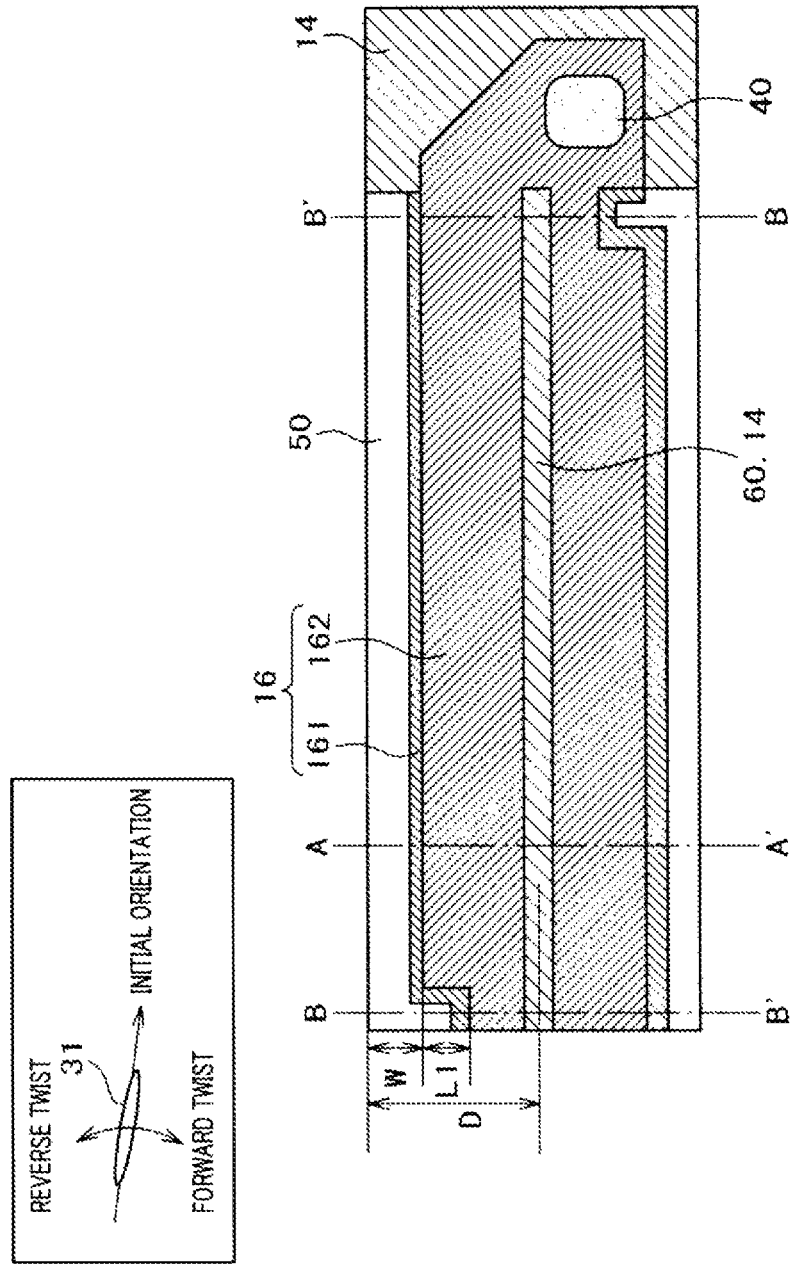
FIG. 1 is a plan view of a pixel according to a first embodiment.
Figure 2:
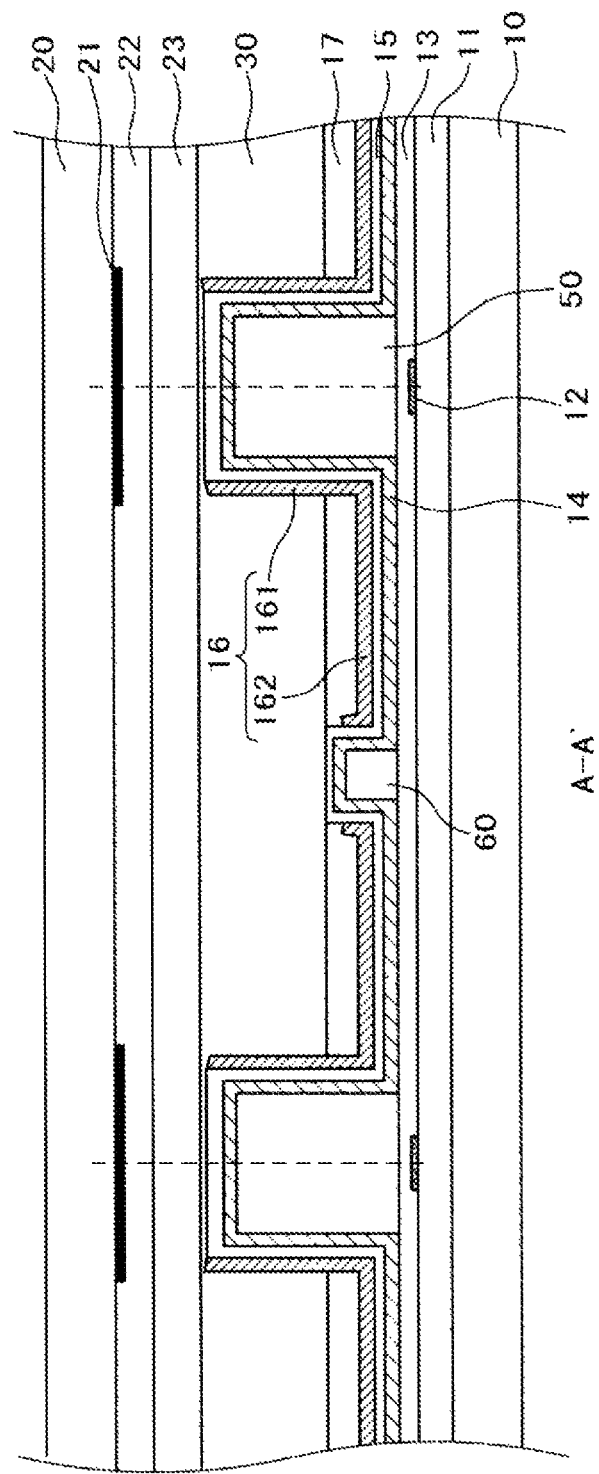
FIG. 2 is a cross section taken on line A-A' of FIG. 1.
Figure 3:
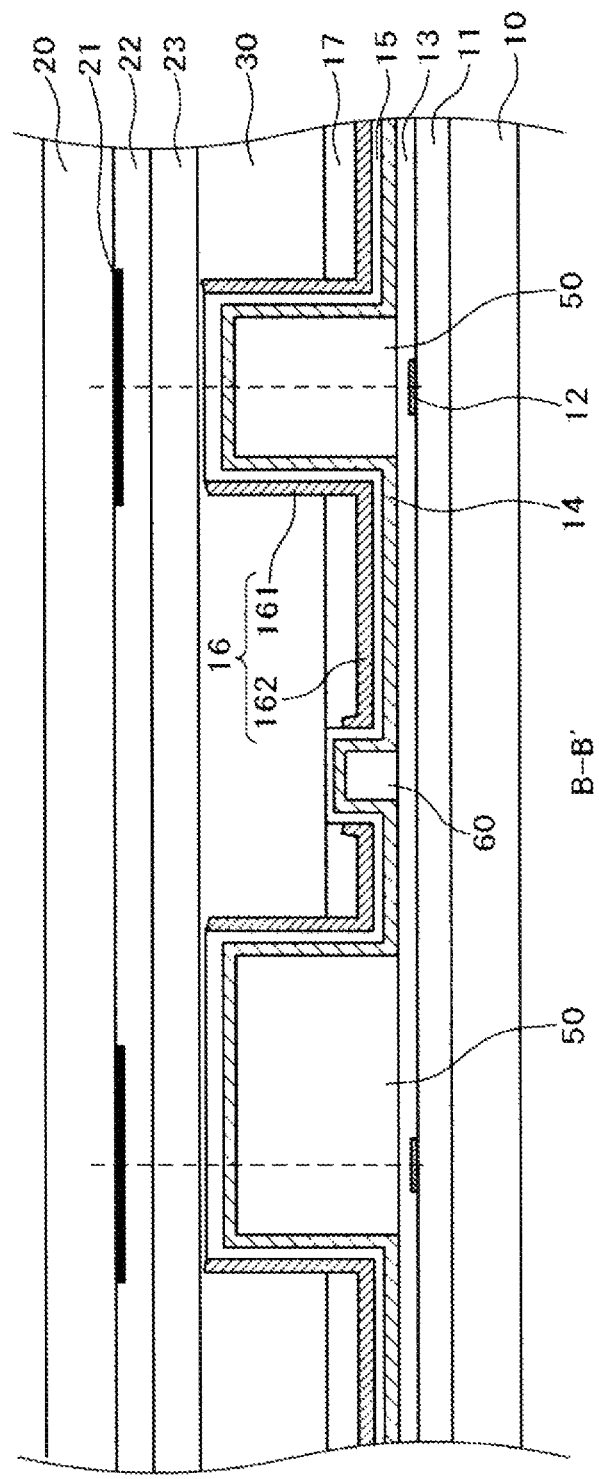
FIG. 3 is a cross section taken on line B-B' of FIG. 1.

FIG. 1 shows a structure of a pixel according to the present invention as a plan view. FIG. 2 is a cross-section taken on line A-A' of FIG. 1. FIG. 3 is a cross section taken on line B-B' of FIG. 1. As FIG. 1 shows, the pixel according to the present invention has different cross section structures between the area around the center of the pixel (taken on line A-A') and the area around the end part of the pixel (taken on line B-B').

Referring to FIG. 1, a small wall 60 transversely extends along the center of the pixel. Large walls 50 transversely extend at the boundary of the pixel while interposing the small wall 60. A common electrode 14 is formed on the upper surface of the small wall 60. A wall electrode 161 is formed at the inner side of the large wall 50, and a plane electrode 162 is formed between the small wall 60 and the large wall 50. A pixel electrode 16 is formed of the wall electrode 161 and the plane electrode 162. A through hole 40 for connecting a video signal line 12 and the pixel electrode is formed at the right side of the pixel. The wall electrode 161 formed on the large wall 50 is bent at both end parts of the pixel. The bent structure serves to prevent generation of the domain in the effective region of the pixel, that is, light transmission region, which is the characteristic of the present invention.

Definition of a twisting direction of a liquid crystal molecule 31 is illustrated at the upper left side of FIG. 1. Referring to FIG. 1, the initial orientation of the liquid crystal molecule 31 is slightly angled clockwise with respect to the horizontal direction. The twist in the same direction as the angle in the initial orientation denotes a forward twist, and the reversely directed twist to the angle in the initial orientation denotes a reverse twist.

FIG. 2 is a cross section taken on line A-A' at the center of the pixel, illustrating a basic structure of the wall electrode IPS. Referring to FIG. 2, a TFT layer 11 is formed on a TFT substrate 10 made of glass. The TFT layer 11 contains a gate electrode, a gate insulating film, a semiconductor layer and the like. The video signal line 12 is formed on the TFT layer 11. A first interlayer insulating film 13 formed of SiN is applied onto the video signal line 12, on which the common electrode 14 is formed. The large wall 50 is formed on the video signal line 12 coated with the first interlayer insulating film 13. The small wall 60 is formed at the center of the pixel. Both the large wall 50 and the small wall 60 are formed of an acrylic resin material, for example.

The common electrode 14 is formed to coat the large wall 50 and the small wall 60. The common electrode 14 that covers the large wall 50 and the small wall 60 is coated with a second interlayer insulating film 15 made of SiN. The pixel electrode 16 is applied onto the second interlayer insulating film 15. The pixel electrode 16 includes the wall electrode 161 and the plane electrode 162.

A planarizing film 17 as an organic passivation film is formed to coat the plane electrode 162 of the pixel electrode 16. The planarizing film 17 serves to make the layer thickness of a liquid crystal layer 30 uniform within the pixel, and to cause the line of electric force between the common electrode 14 on the small wall 60 and the plane electrode 162 of the pixel electrode 16 to be a transverse component in the liquid crystal layer 30. In other words, the line of electric force generated from the plane electrode 162 functions as the longitudinal electric field within the planarizing film 17, while functioning as the transverse electric field within the liquid crystal layer 30. This makes it possible to improve the display mode efficiency.

Referring to FIG. 2, a counter substrate 20 is provided, while having the liquid crystal layer 30 interposed. The counter substrate 20 made of glass includes a black matrix 21, a color filter 22, and an over coat film 23 that coats the color filter 22. Alignment films formed at the sides of the TFT substrate 10 and the counter substrate 20 are not shown in FIG. 2.

Referring to FIG. 2, the large wall 50 serves as a columnar spacer that defines the distance between the TFT substrate 10 and the counter substrate 20. The large wall 50 forms a boundary with the neighboring pixel so that the electric field of the pixel electrode 16 is not applied to the neighboring pixel. The small wall 60 has its height equal to or higher than 1 μm.

FIG. 3 is a cross section taken on line B-B' of FIG. 1, illustrating the characteristic of the present invention. Referring to FIG. 1, the part of the large wall 50 as indicated by B-B' has a larger width, and correspondingly, the width of the plane electrode 162 is reduced. FIG. 1 shows the difference L1 in the thickness of the large wall 50 between the end part and the area around the center. The drawing also shows a thickness W+L1 as a total of the width of the large wall 50 and the thickness of the wall electrode 161 at the end part of the pixel as well as a dimension D that is half the minor axis of the pixel.

The aforementioned relationship is indicated by the cross section of FIG. 3. Referring to FIG. 3, the width of the plane electrode 162 to the left of the small wall 60 is smaller than that of the plane electrode 162 to the right, and correspondingly, the width of the liquid crystal layer 30 is reduced. In this way, the end part where the width of the liquid crystal layer 30 is reduced allows suppression of generation of the domain within the effective region of the pixel to be explained later. The rest of the structure shown in FIG. 3 is the same as described referring to FIG. 2.

Figure 4:
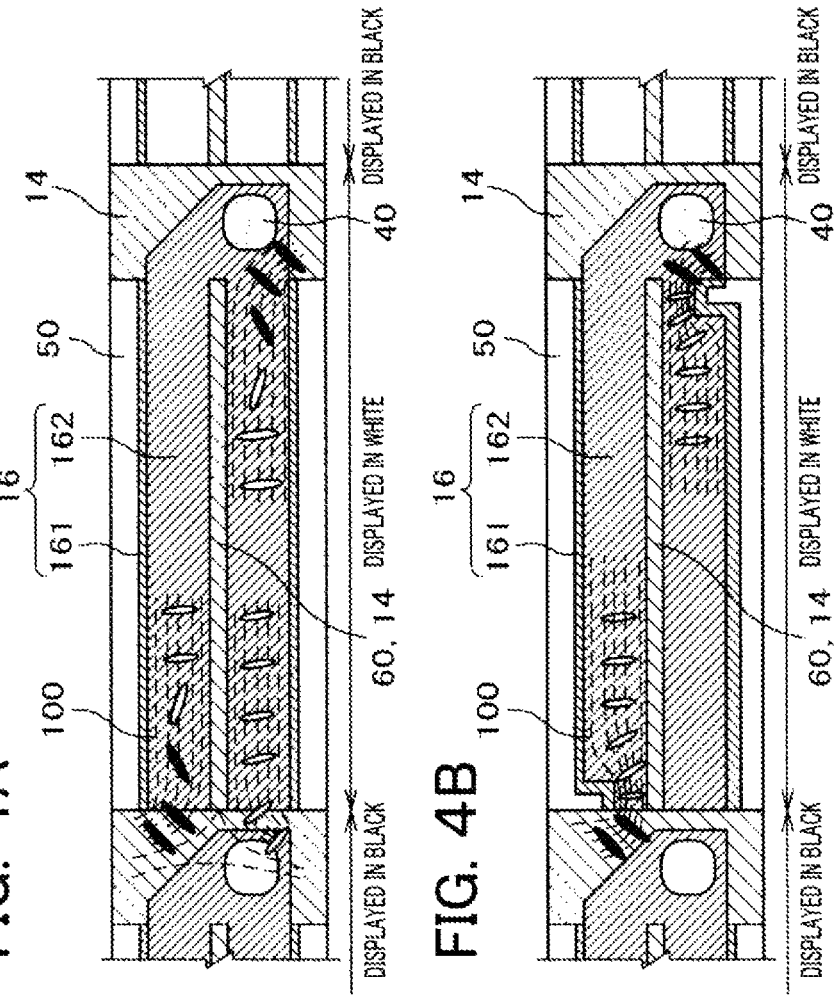
FIGS. 4A and 4B are plan views showing an operation of the present invention in comparison with the related art.

FIGS. 4A and 4B are plan views showing an effect of the present invention in comparison with the related art. FIG. 4A is a plan view showing a problem of the related art. Referring to FIG. 4A, a dotted line denotes an equipotential line generated between the wall electrode 161 formed on the large wall 50 and the common electrode 14 formed on the small wall 60. The liquid crystal molecule 31 is likely to be oriented in the direction perpendicular to the equipotential line. However, the angle with respect to the equipotential line varies depending on the relationship with direction of the initially oriented liquid crystal molecule 31.

As for the related art, at the end part of the pixel, the liquid crystal molecule 31 may have the twist in the direction along its twisting direction at the area around the center (hereinafter referred to as forward twist direction), and the twist in the reverse direction to the forward twist direction. The part of the liquid crystal molecule 31, in which the forward and reverse twists occur may be the region where so called a domain 100 is generated. As the light cannot transmit through this part, the transmittance of the pixel is decreased to reduce brightness of the screen. Referring to FIGS. 4A and 4B, the liquid crystal molecules 31 that are forward twisted are shown in white, and the liquid crystal molecules 31 that are reversely twisted are shown in black.

FIG. 4B is a plan view showing the pixel structure according to the present invention. Referring to FIG. 4B, the large wall 50 has the larger thickness at the end part of the pixel. This causes the wall electrode 161 to be bent toward the center. As the wall electrode 161, that is, the pixel electrode 16 has bent portion at the end part, the resultant equipotential line has the larger component for twisting the liquid crystal molecules 31 in the forward direction. As a result, in the part of the pixel for transmitting light, all the liquid crystal molecules 31 are oriented in the forward direction, thus preventing generation of the domain.

Meanwhile, the equipotential line that reversely twists the liquid crystal molecule 31 is generated in the part of the pixel where the large wall 50 is not formed, that is, the part that does not allow transmission of the light from the backlight. In this part, the domain 100 is generated. Meanwhile, the part where the domain 100 is generated as shown in FIG. 4B originally does not; allow transmission of the light. This hardly influences the transmittance of the liquid crystal display panel.

In other words, when the wall electrode 161 is bent at the end part of the pixel, the distance between the wall electrode 161 and the common electrode 14 at the center is reduced. The electric field in the resultant region has the highest intensity in the pixel. As for the aforementioned structure, the electric field at the outer side of the pixel is directed to reversely twist the liquid crystal molecule, and the electric field at the inner side of the pixel is directed to strongly twist the liquid crystal molecule 31 forward. The liquid crystal reversely twisted at the outer side of the pixel is dammed by the forward twisted electric field at the inner side of the wall electrode 161. In other words, the domain 100 at the end part of the pixel is generated only in the narrow area between the wall electrode 161 and the common electrode 14 at the center, which makes it possible to hide the dark line in the display region from view.

In this way, the present invention is configured to have the wall electrode 161 formed on the large wall 50 bent toward the center at the area around the end part of the pixel. The domain is not generated in the region of the pixel that allows light transmission, thus making it possible to suppress deterioration in the transmittance without, generating the domain.

Figure 5:
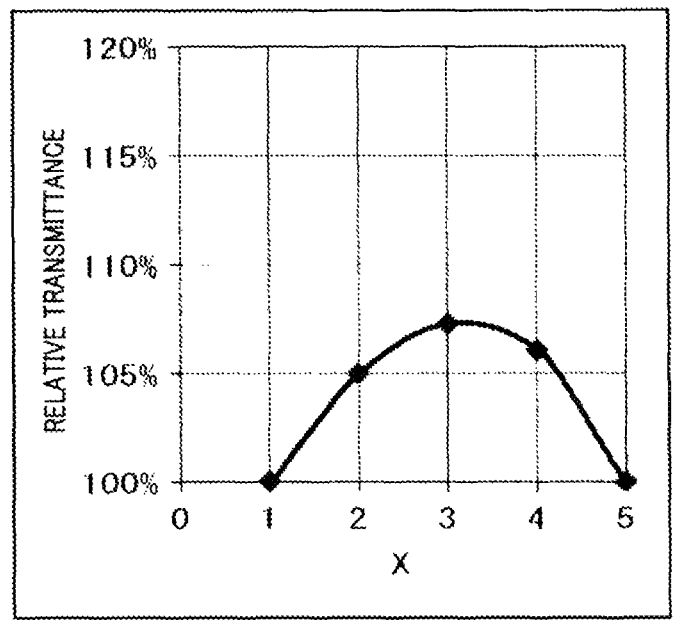
FIG. 5 is a graph showing a relationship between a bending length of the wall electrode and the transmittance as described in the first embodiment.

FIG. 5 is a graph representing the relationship between configuration of the end part of the pixel, which has the bent wall electrode 161 in association with increase in the width of the large wall 50 as shown in FIG. 1, and the transmittance of the pixel. The graph shows that the transmittance is kept high so long as no domain is generated. As shown in FIG. 1, W denotes the width of the large wall 50 including the thickness of the wall electrode 161 at the center of the pixel, L1 denotes the bending length of the wall electrode toward the center of the pixel in association with increase in the width of the large wall, and D denotes the dimension ½ of the minor axis of the pixel.

In the aforementioned case, the value derived from the formula $$(D-W)/X \tag{1}$$

is defined so as to examine with respect to the bending length L1 of the wall electrode 161, which may prevent generation of the domain efficiently. Referring to FIG. 5, x-axis is represented by X, and y-axis denotes the relative transmittance. As FIG. 5 shows, the relative transmittance may be improved by 5% or higher in the range of X from 2 to 4. If X=2 in the formula (Id, the value of L1 is equal to (D−W)/2, that is, the value L1 as the bending length of the wall electrode 161 at the end part of the pixel becomes approximately ½ of the width of the plane electrode at the area around the center of the pixel. If X=4, the value of L1 becomes approximately ¼ of the width of the plane electrode at the area around the center of the pixel. When the bending length L1 of the wall electrode 161 is approximately ¼ to ½ of the width of the plane electrode at the area around the center of the pixel, generation of the domain may foe suppressed efficiently.

Figure 6:
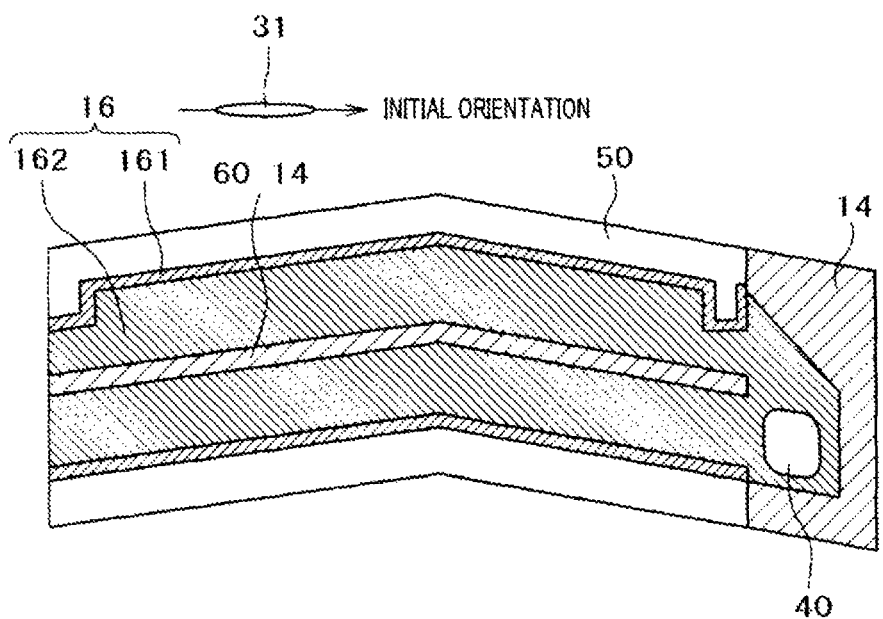
FIG. 6 shows an example formed by applying the first embodiment to a multi-domain structure.

FIG. 6 is a plan view showing that the structure described referring to FIG. 1 is applied to the multi-domain pixel. The multi-domain denotes the structure having the common electrode 14 formed on the small wall 60 and the pixel electrode 16 formed of the wall electrode 161 and the plane electrode 162 bent at predetermined angles at the area around the center of the pixel in order to improve uniformity of the viewing angle. The end part of the pixel shown in FIG. 6 shows the large wall 50 with larger thickness and the bent wall electrode 161 as described referring to FIG. 1. This makes it possible to efficiently prevent generation of the domain at the end part of the pixel as described referring to FIG. 4.

Second Embodiment

Figure 7:
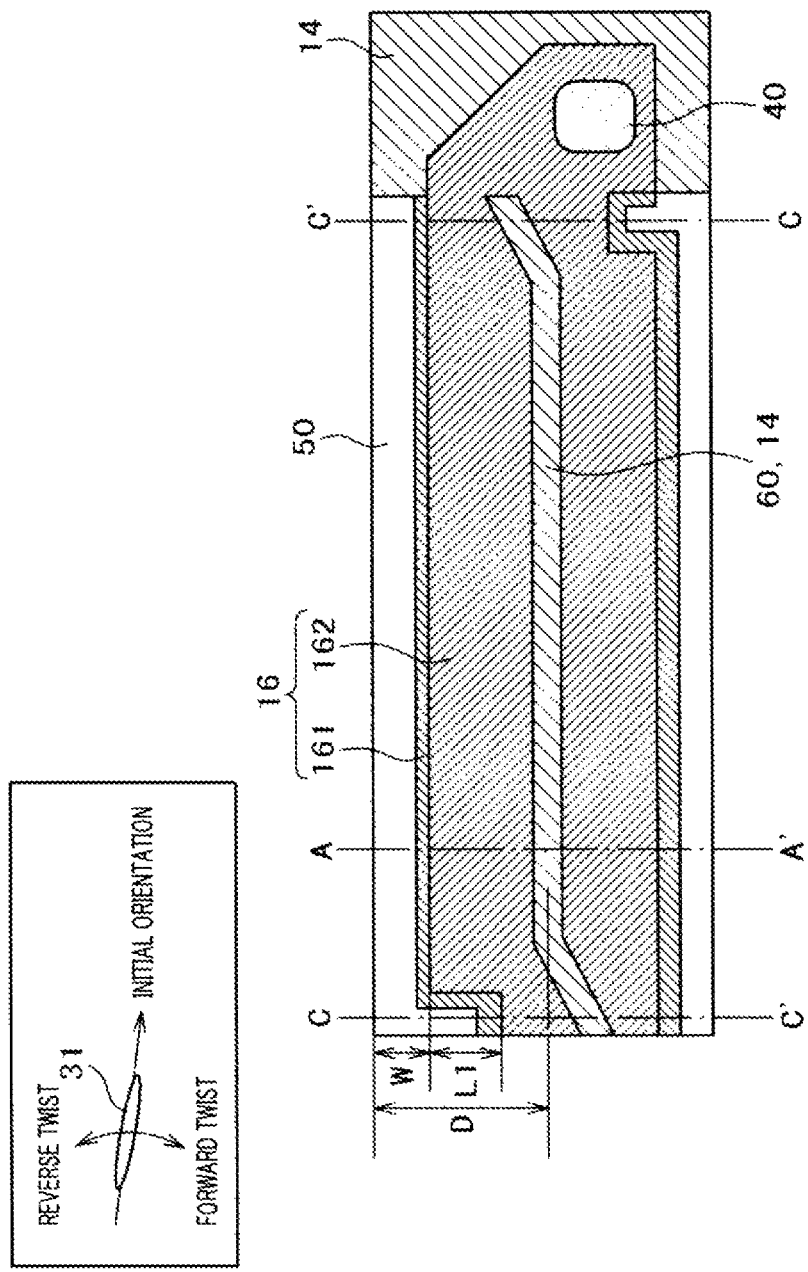
FIG. 7 is a plan view of the pixel according to a second embodiment.
Figure 8:
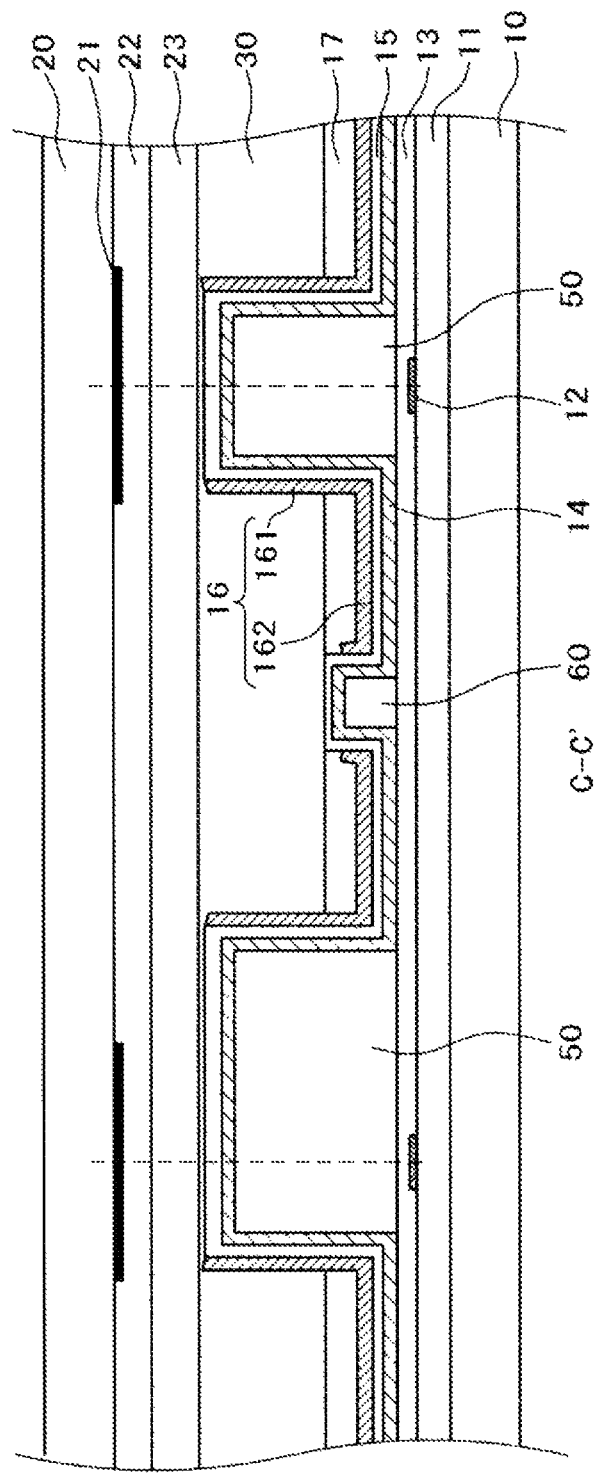
FIG. 8 is a cross section taken on line C-C of FIG. 7.

FIG. 7 is a plan view of the pixel according to a second embodiment of the present invention. FIG. 8 is a cross section taken on line C-C' of FIG. 7. The cross section taken on line A-A' of FIG. 7 is the same as the one used for explanation referring to FIG. 2. Referring to FIG. 7, like the first embodiment, the width of the large wall 50 is increased at the end part of the pixel, and the wall electrode 161 is bent toward the center of the pixel. The characteristic of the embodiment is that the small wall 60 is bent in the direction where the wall electrode 161 is bent in association with increase in the width of the large wall 50 as shown in FIG. 7. In other words, the small wall 60 is bent at the area around where the pixel electrode 161 is bent in the direction away from the bent pixel electrode 161.

FIG. 8 is a cross section taken on line C-C' of FIG. 7 representing a structure of the end part of the pixel. As FIG. 8 shows, one of the large walls 50 has the larger width. The small wall 60 is positioned to the right rather than the center of the pixel in the minor axis direction. The rest of the structure is the same as described referring to FIG. 2 or 3.

Figure 9:
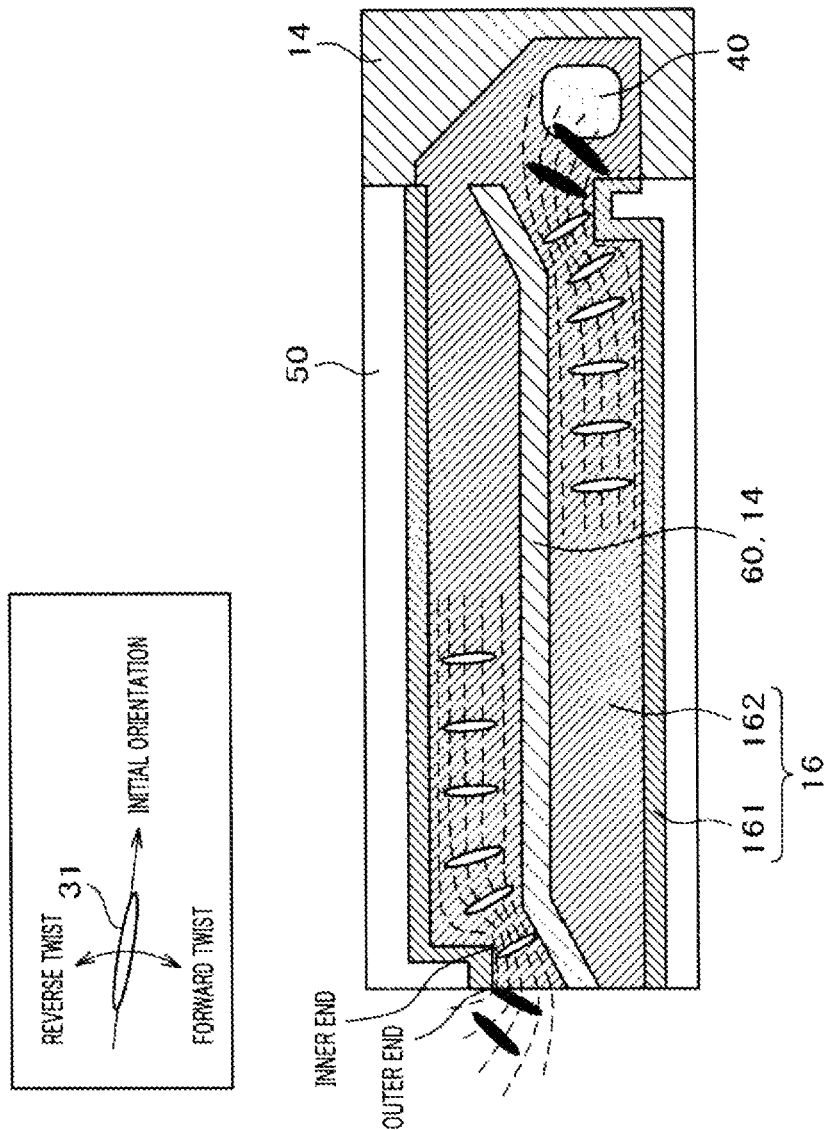
FIG. 9 is a plan view showing an operation of the second embodiment.

FIG. 9 is a plan view of the pixel representing an operation of the embodiment. Referring to FIG. 9, in the pixel, the narrowest part between the wall electrode 161 and the common electrode 14, which have the bent structures at the end parts of the pixel is the distance defined by the small wall 60 and the top end of the wall electrode 161 in the direction perpendicularly extending from the wall surface of the small wall 60. Intensity of the electric field in this part becomes the highest. Meanwhile, at the top end of the wall electrode 161 at the outer side of the pixel, the common electrode 14 that coats the small wall 60 is diagonally bent, and the distance between the wall electrode 161 and the common electrode 14 is widened compared to the position at the top end of the bent wall electrode 161 at the inner side of the pixel, resulting in a weakened electric field. In this case, the liquid crystal molecule at the top end of the bent wall electrode 161 at the outer side is reversely twisted, and the one at the top end at the inner side is twisted forward. At the top end of the wall electrode 161 at the inner side, the liquid crystal is moved in the forward twisted direction by the electric field in the forward twisted direction. Meanwhile, at the top end of the wall electrode 161 at the outer side, the liquid crystal is moved in the reverse twisted direction by electric field in the reverse twisted direction. Accordingly, the domain is generated between the liquid crystal twisted forward and the liquid crystal twisted reversely. However, as the electric field in the forward twisted direction has higher intensity than the electric field in the reverse twisted direction, the domain is forced outside the pixel. Therefore, the display mode efficiency may be improved as the whole pixel without generating the domain within the display region of the pixel.

Figure 10:
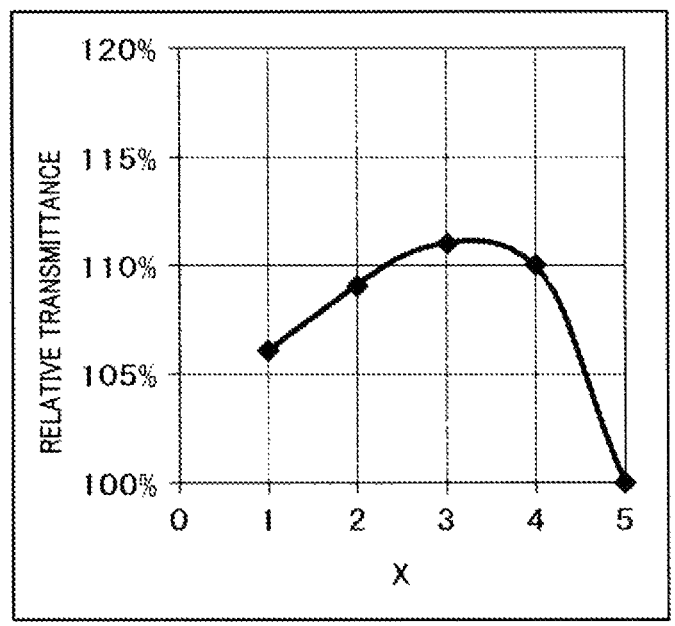
FIG. 10 is a graph showing a relationship between the bending length of the wall electrode and the transmittance as described in the second embodiment.

FIG. 10 is a graph representing the relationship between configuration of the end part of the pixel, which has the bent wall electrode 161 in association with increase in the width of the large wall 50 as shown in FIG. 7 and further has the small wall 60 that is bent in the direction away from the bent wall electrode 161, and the transmittance of the pixel. The graph shows that the transmittance is kept high as long as no domain is generated. As shown in FIG. 7, W denotes the width of the large wall including the thickness of the wall electrode 161 at the region around the center of the pixel, L1 denotes the bending length of the wall electrode toward the center of the pixel in association with increase in the width of the large wall, and D denotes the dimension half the minor axis of the pixel. The above conditions are the same as those defined in the first embodiment.

In the aforementioned case, like the first embodiment, the value derived from the formula $$(D-W)/X \tag{1}$$

is defined so as to examine with respect to the bending length L1 of the wall electrode 161, which may prevent generation of the domain efficiently. Referring to FIG. 10, x-axis is represented by X, and y-axis denotes the relative transmittance. As FIG. 10 shows, the relative transmittance may be improved by 5% or higher in the range of X from 1 to 4.5. If X is in the range from 2.5 to 4, the relative transmittance may further be improved by 10% or higher. If X is equal to 3, the relative transmittance may be improved by 11% or higher.

If X=1 in the formula (I), the value of L1 is substantially equal, to the width of the plane electrode 162 at the area around the center of the pixel. If X=4.5, the value of L1 is approximately 1/4.5 of width of the plane electrode 162 at the area around the center of the pixel. In other words, generation of the domain may be effectively suppressed when the bending length L1 of the wall electrode 161 is approximately in the range from 1/4.5 to 1 of the width of the plane electrode 161 at the area around the center.

Figure 11:
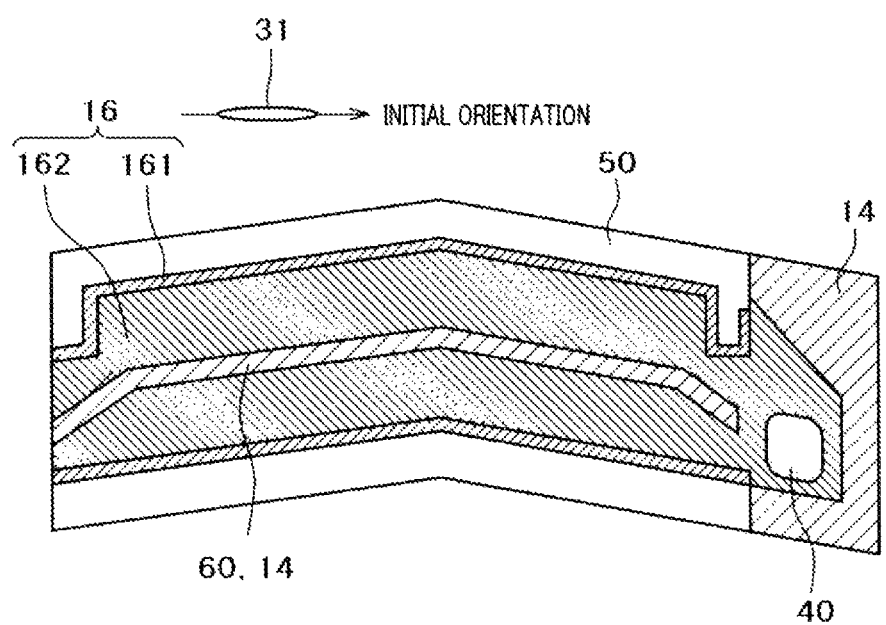
FIG. 11 shows an example formed by applying the second embodiment to the multi-domain structure.

FIG. 11 is a plan view showing that the structure described referring to FIG. 7 is applied to the multi-domain pixel. As described referring to FIG. 1, at the end part of the pixel as shown in FIG. 1I, the thickness of the large wall 50 is increased and the wall electrode 161 is bent. At the end part of the pixel, the small wall 60 is bent in the direction away from the bent wall electrode 161. The structure as shown in FIG. 11 allows improvement in the transmittance in the same manner as shown in the graph of FIG. 10.

Third Embodiment

Figure 12:
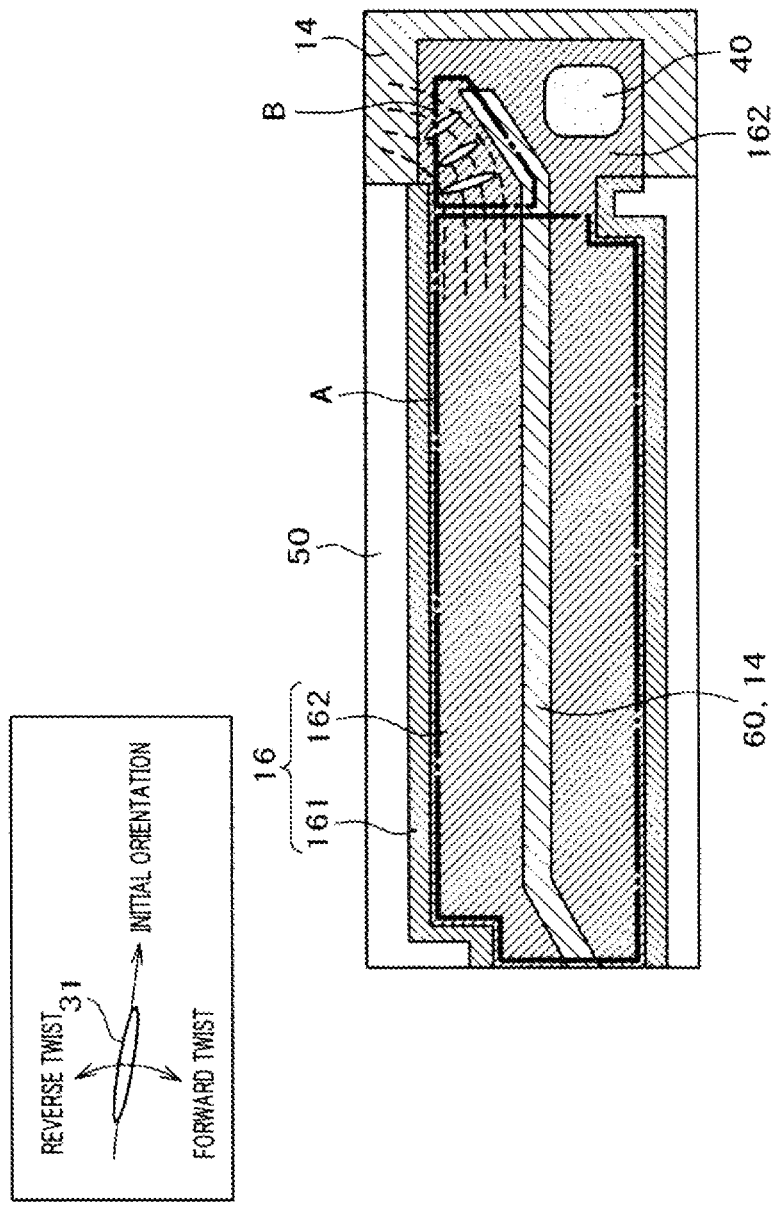
FIG. 12 is a plan view of the pixel according to a third embodiment.

FIG. 12 is a plan view of a pixel according to a third embodiment of the present invention. The structure shown in FIG. 12 is configured by extending the bent structure of the common electrode 14 formed on the small, wall 60 as shown in FIG. 7 according to the second embodiment to the area around the through hole 40 at the end part of the pixel. Extending the common electrode 14 formed on the small wall 60 to the area around the through hole 40 allows the liquid crystal around the through hole 40 to serve as the display region, thus improving the transmittance.

As FIG. 12 shows, the structure has the bent small wall 60, which allows the liquid crystal molecule 31 to be twisted forward in the liquid crystal layer around the through hole 40, suppressing generation of the domain. That is, the transmission region may be widened while suppressing generation of the domain, resulting in improved transmittance. A region A enclosed by the dashed line as shown in FIG. 12 serves as the generally employed display region. In this embodiment, in addition to the aforementioned region, a region B enclosed by the dashed line at the area around the through hole 40 is allowed to contribute to the display, which makes it possible to increase the transmittance correspondingly.

Figure 13:
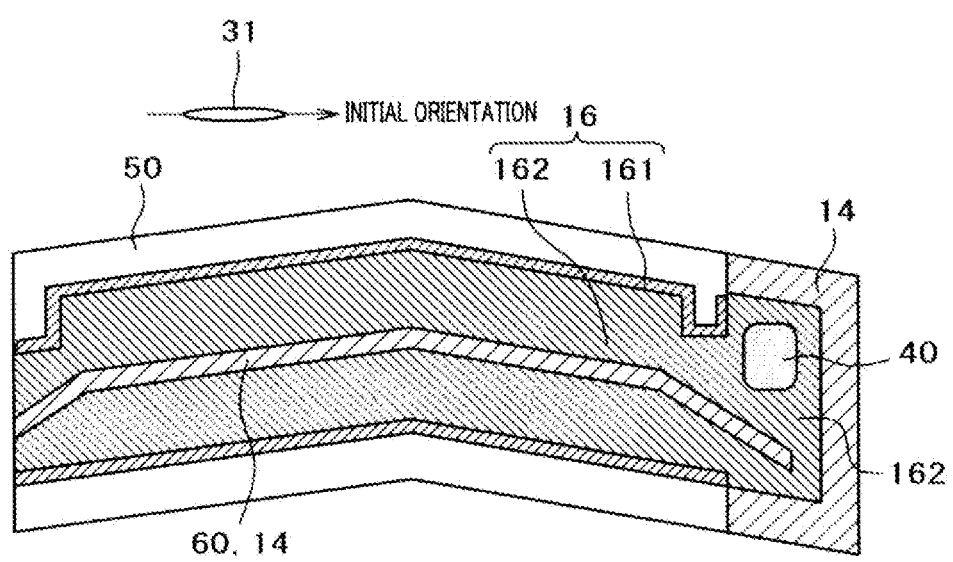
FIG. 13 shows an example formed by applying the third embodiment to the multi-domain structure.

FIG. 13 is a plan view showing that the structure described referring to FIG. 12 is applied to the multi-domain pixel. Like the description referring to FIG. 1, at the end part of the pixel shown in FIG. 13, the thickness of the large wall 50 is increased, and the wall electrode 161 is bent. At the end part of the pixel, the small wall 60 is bent in the direction away from the bent wall electrode 161, and extends to the area around the through hole 40. This makes it possible to aim at improving the transmittance of the structure as shown in FIG. 13 in the same manner as described referring to FIG. 12.

Fourth Embodiment

Figure 14:
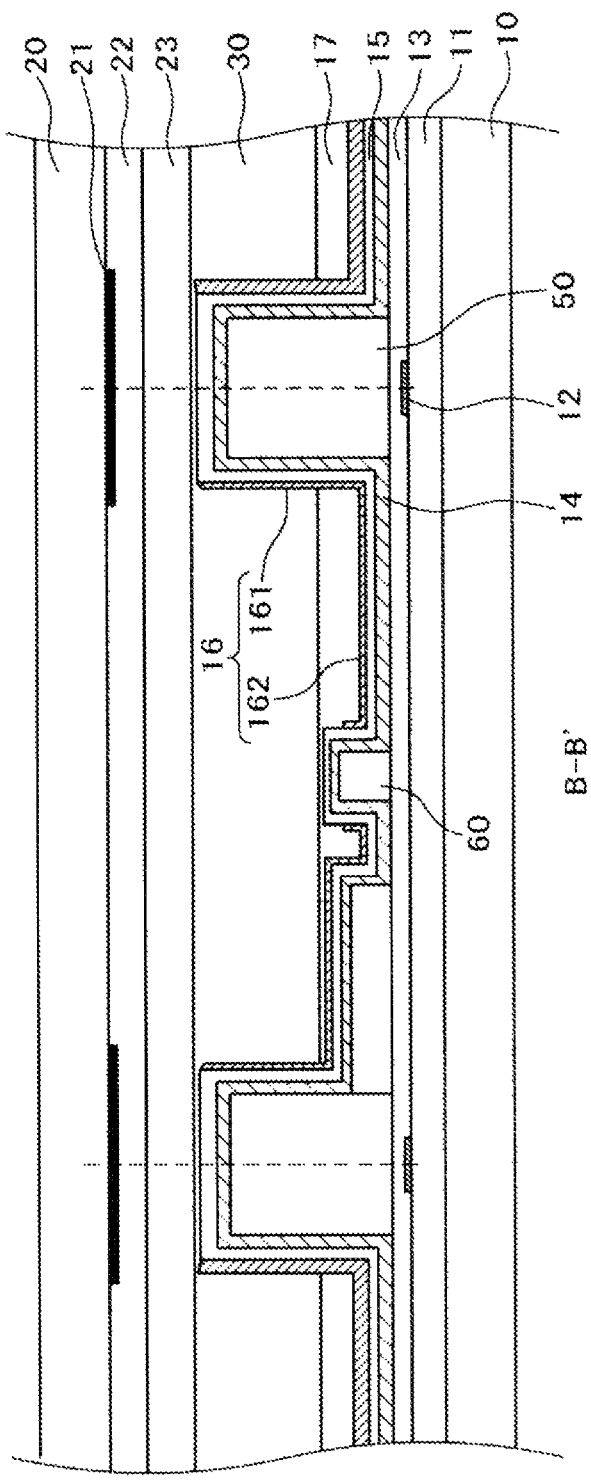
FIG. 14 is a cross section of the pixel according to a fourth embodiment.

FIG. 14 is a cross section of the pixel structure according to the embodiment. FIG. 14 corresponds to the cross section taken on line B-B' of FIG. 1. The difference in the structure from the first embodiment as shown in FIG. 3 is that the part of the large wall 50 corresponding to the thickness increased by L1 is as high as the small wall 60. Therefore, the thickness of the large wall 50 at the end part of the pixel is the same as that of the large wall 50 at the area around the center of the pixel.

Even if the wall that bends the pixel electrode 161 at the end part of the pixel is as high as the small wall 60, the equipotential line as shown, in FIG. 4B is generated, which makes it possible to prevent generation of the domain in the display region. Additionally the wall that bends the pixel electrode 16 at the end part of the pixel in the embodiment shown in FIG. 14 is as high as the small wall 60, which allows the liquid crystal layer formed thereon to serve as the display region. This makes it possible to improve the transmittance correspondingly.

Fifth Embodiment

Figure 15:
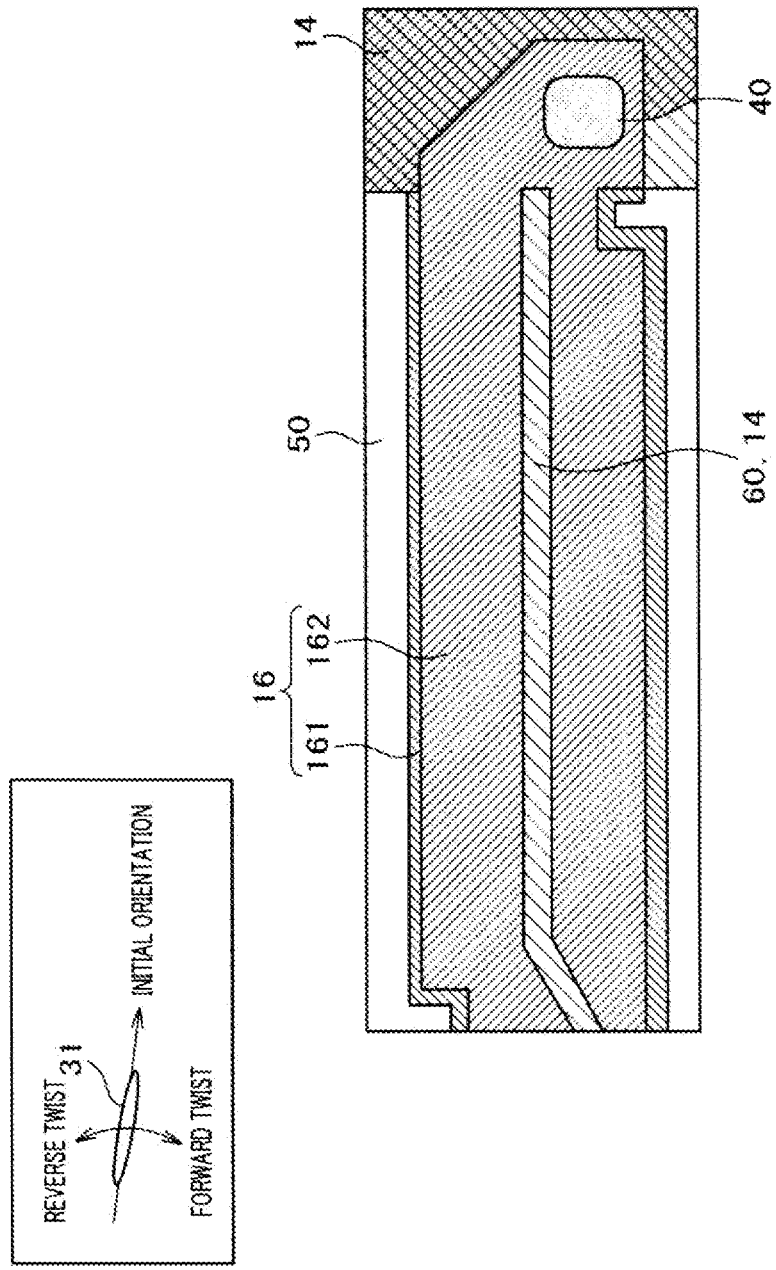
FIG. 15 shows an example formed by combining the pixels shown in FIGS. 1 and 7.

This embodiment is an example derived from combining the structures as described in the first to the fourth embodiments. FIG. 15 shows a structure derived from combining those of the first embodiment shown in FIG. 1 and the second embodiment shown in FIG. 7. The structure of the second, embodiment shown in FIG. 7 has the small wall 60 bent at both end parts of the pixel. Meanwhile, the structure shown in FIG. 15 has the small wall 60 bent only at one end part of the pixel where the through hole 40 is not formed. The embodiment shown in FIG. 15 has the intermediate feature between those shown FIG. 1 and FIG. 7.

Figure 16:
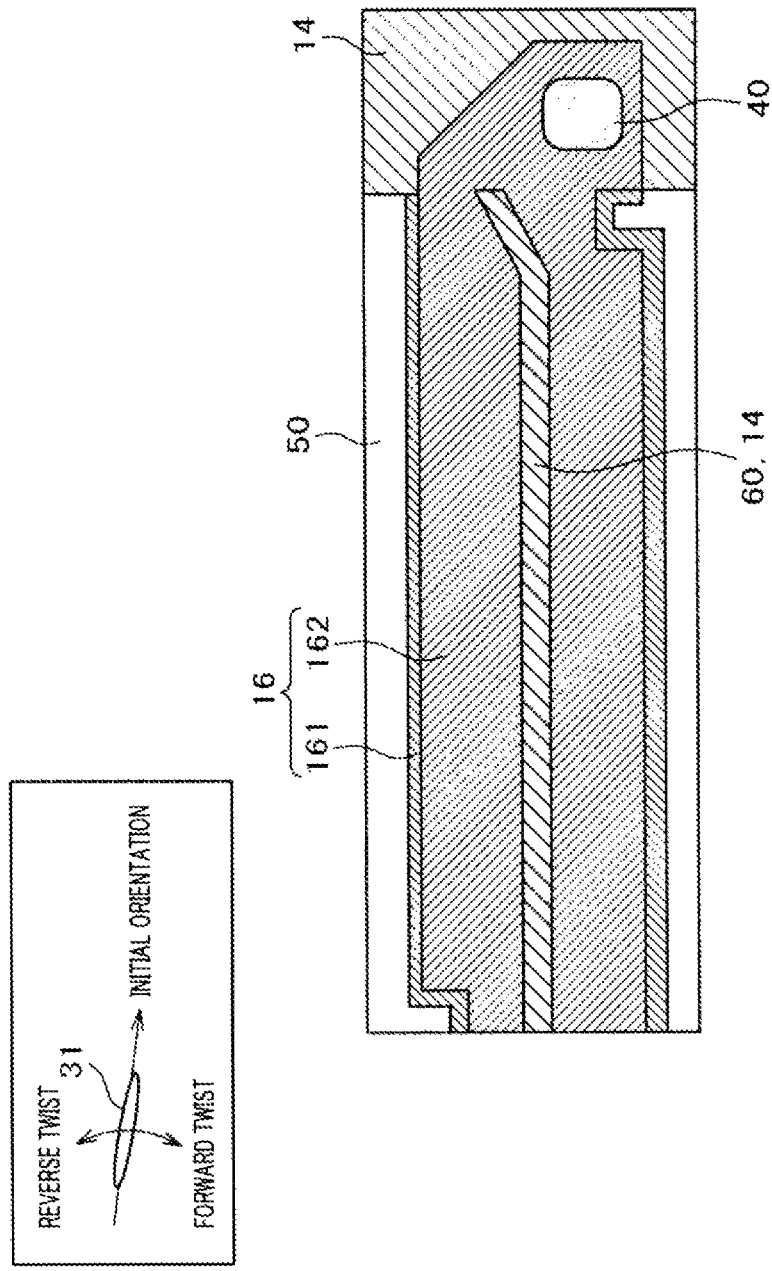
FIG. 16 shows another example formed by combining the pixels shown in FIGS. 1 and 7.

FIG. 16 shows another example derived, from combining the structures as described in the first embodiment shown in FIG. 1 and the second embodiment shown in FIG. 7. The structure of the second embodiment shown in FIG. 7 has the small wall 60 bent at both end parts of the pixel. Meanwhile, the structure shown in FIG. 16 has the small wall 60 bent only at one end part of the pixel where the through hole 40 is formed. Therefore, the embodiment shown in FIG. 16 also has the intermediate feature between those shown in FIG. 1 and FIG. 7.

Figure 17:
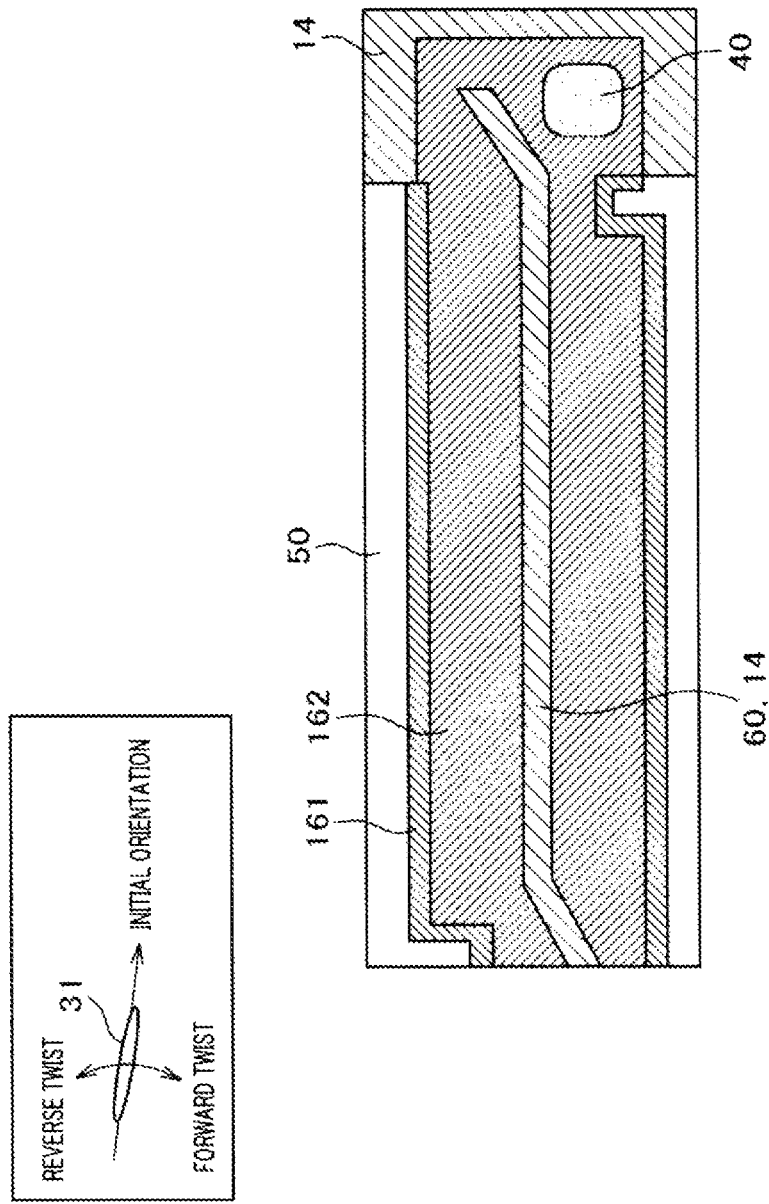
FIG. 17 shows an example formed by combining the pixels shown in FIGS. 1 and 12.

FIG. 17 shows an example derived from combining the structures of the first embodiment shown in FIG. 1 and the third embodiment shown in FIG. 12. The structure of the third embodiment shown in FIG. 12 has the small wall 60 bent at both end parts of the pixel up to the area around the through hole 40. The structure shown in FIG. 17 has the small wall 60 bent only at one end part of the pixel where the through hole 40 is formed up to the area therearound. The structure of the embodiment shown in FIG. 17 allows the liquid crystal layer 30 to be used as the display region at the area around the through hole 40. This makes it possible to improve the transmittance by the amount corresponding to the region B enclosed by the dashed line in FIG. 12.

Figure 18:
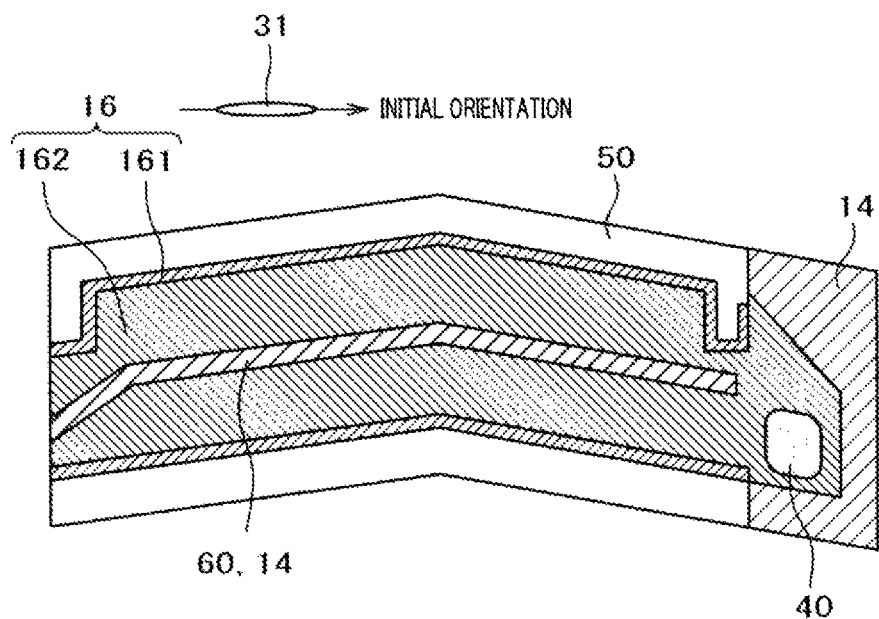
FIG. 18 shows an example formed by combining the pixels shown in FIGS. 6 and 11.

FIG. 18 shows an example derived from combining the first embodiment, shown in FIG. 6 and the second embodiment shown in FIG. 11. The structure shown in FIG. 18 is formed by applying the structures of the first embodiment and the second embodiment to the pixel with the multi-domain structure, that is, applying the first embodiment to the end part of the pixel at the side where the through hole 40 is formed, and the second embodiment to the end part of the pixel at the side where the through hole 40 is not formed. Accordingly, the embodiment shown in FIG. 18 has the intermediate feature between those of the first embodiment shown in FIG. 6 and the second embodiment shown in FIG. 11.

Figure 19:
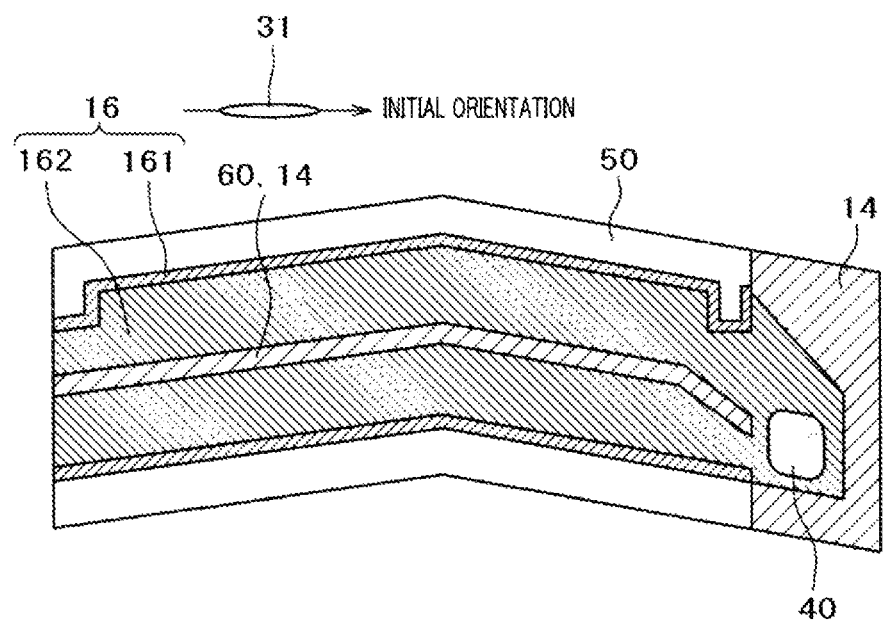
FIG. 19 shows another example formed by combining the pixels shown in FIGS. 6 and 11.

FIG. 19 shows an example derived from, combining the first embodiment shown in FIG. 6 and the second embodiment shown in FIG. 11. The structure shown in FIG. 19 is formed by applying the structures of the first embodiment and the second embodiment to the pixel with the multi-domain structure, that is, applying the second embodiment to the end part of the pixel at the side where the through hole 40 is formed, and the first embodiment to the end part of the pixel at the side where the through hole 40 is not formed. Accordingly, the embodiment shown in FIG. 19 has the intermediate feature between those of the first embodiment shown in FIG. 6 and the second embodiment shown, in FIG. 11.

What is claimed is:

1. A liquid crystal display device having a pixel structure provided with a large wall formed along a long side of a pixel with a rectangular plane, a small wall formed at a center of the pixel and extending in the same direction as the large wall, a wall electrode formed on a wall surface of the large wall, a plane electrode formed between the small wall and the large wall, in which the wall electrode and the plane electrode form a pixel electrode, and a common electrode formed on a surface of the small wall,
    wherein the large wall has a part with an increased thickness at an end part of the pixel;
    the wall electrode is bent in a direction toward the center of the pixel;
    wherein the large wall is higher than the small wall; and
    wherein the large wall has a side surface and the small wall has a side surface, and a planarizing film is formed between the side surface of the large wall and the side surface of the small wall.

2. The liquid crystal display device according to claim 1, wherein a relationship of $(D-W)/2 \geq L1 \geq (D-W)/4$ is held, where W denotes a total value of the thickness of the large wall at an area around the center of the pixel and a thickness of the wall electrode, D denotes a dimension ½ of a minor axis of the pixel, and L1 denotes the increased thickness of the large wall at the end part of the pixel.

3. The liquid crystal display device according to claim 2, wherein the large wall and the small wall are bent at an area around the center of the long side of the pixel.

4. A liquid crystal display device having a pixel structure provided with a large wall formed along a long side of a pixel with a rectangular plane, a small wall formed at a center of the pixel and extending in the same direction as the large wall, a wall electrode formed on a wall surface of the large wall, a plane electrode formed between the small wall and the large wall, in which the wall electrode and the plane electrode form a pixel electrode, and a common electrode formed on a surface of the small wall,
    wherein the large wall has a part with an increased thickness at an end part of the pixel;
    the wall electrode is bent in a direction toward the center of the pixel;
    the small wall is bent in a direction away from the bent wall electrode at the end part of the pixel;
    wherein the large wall is higher than the small wall; and
    wherein the large wall has a side surface and the small wall has a side surface, and a planarizing film is formed between the side surface of the large wall and the side surface of the small wall.

5. The liquid crystal display device according to claim 4, wherein a relationship of $(D-W)/1 \geq L1 \geq (D-W)/4$ is held, where W denotes a total value of the thickness of the large wall at an area around the center of the pixel and a thickness of the wall electrode, D denotes a dimension ½ of a minor axis of the pixel, and L1 denotes the increased thickness of the large wall at the end part of the pixel.

6. The liquid crystal display device according to claim 5, wherein the large wall and the small wall are bent at an area around the center of the long side of the pixel.

7. A liquid crystal display device having a pixel structure provided with a large wall formed along a long side of a pixel with a rectangular plane, a small wall formed at a center of the pixel and extending in the same direction as the large wall, a wall electrode formed on a wall surface of the large wall, a plane electrode formed between the small wall and the large wall, in which the wall electrode and the plane electrode form a pixel electrode, and a common electrode formed on a surface of the small wall,
- wherein the large wall has a part with an increased thickness at an end part of the pixel;
- the wall electrode is bent in a direction toward the center of the pixel;
- the small wall has a length longer than that of the large wall; and
- a part of the small wall corresponding to the length longer than that of the large wall is bent in a direction away from the bent wall electrode.

8. The liquid crystal display device according to claim 7, wherein a through hole is formed on the opposite side where the small wall is bent.

9. The liquid crystal display device according to claim 8, wherein the large wall and the small wall are bent at an area around the center of the long side of the pixel.

* * * * *

UNITED STATES PATENT AND TRADEMARK OFFICE
CERTIFICATE OF CORRECTION

PATENT NO. : 8,928,847 B2
APPLICATION NO. : 13/790590
DATED : January 6, 2015
INVENTOR(S) : Takato Hiratsuka et al.

It is certified that error appears in the above-identified patent and that said Letters Patent is hereby corrected as shown below:

In the Specification
Column 1, line 6, change "JP 2012-086872" to --JP 2012-088872--;
Column 1, line 18, change "panel, used" to --panel used--;
Column 1, line 54, change "definition, has" to --definition has--;
Column 1, line 62, change "wall, electrode" to --wall electrode--;
Column 2, line 26, change "wall, surface" to --wall surface--;
Column 2, line 48, change "small, wall" to --small wall--;
Column 2, line 54, change "wall, has" to --wall has--;
Column 2, line 63, change "generation, of" to --generation of--;
Column 3, line 19, change "line C-C" to --line C-C'--;
Column 4, line 7, change "Definition, of" to --Definition of--;
Column 4, lines 9-10, change "crystal, molecule" to --crystal molecule--;
Column 4, line 10, change "with, respect" to --with respect--;
Column 4, line 13, change "directed, twist" to --directed twist--;
Column 4, line 13, change "initial, orientation" to --initial orientation--;
Column 4, line 21, change "formed, of SiN" to --formed of SiN--;
Column 4, line 39-40, change "common, electrode" to --common electrode--;
Column 5, line 56, change "does not; allow" to --does not allow--;
Column 6, line 12, change "without, generating" to --without generating--;
Column 6, line 45, change "foe" to --be--;
Column 8, line 6, change "equal, to" to --equal to--;
Column 8, line 29, change "small, wall" to --small wall--;
Column 9, line 6, change "shown, in FIG. 4B" to --shown in FIG. 4B--;
Column 9, lines 21-22, change "second, embodiment" to --second embodiment--;
Column 9, line 28, change "derived, from" to --derived from--;
Column 9, line 52, change "embodiment, shown" to --embodiment shown--;
Column 9, line 63, change "from, combining" to --from combining--; and
Column 10, line 7, change "shown, in FIG. 11" to --shown in FIG. 11--.

Signed and Sealed this
Sixteenth Day of June, 2015

Michelle K. Lee
*Director of the United States Patent and Trademark Office*